(12) United States Patent
Algreatly

(10) Patent No.: US 8,638,315 B2
(45) Date of Patent: Jan. 28, 2014

(54) VIRTUAL TOUCH SCREEN SYSTEM

(76) Inventor: Cherif Atia Algreatly, Newark, CA (US)

( * ) Notice: Subject to any disclaimer, the term of this patent is extended or adjusted under 35 U.S.C. 154(b) by 861 days.

(21) Appl. No.: 12/803,938

(22) Filed: Jul. 9, 2010

(65) Prior Publication Data

US 2011/0007008 A1     Jan. 13, 2011

Related U.S. Application Data

(60) Provisional application No. 61/270,735, filed on Jul. 13, 2009.

(51) Int. Cl.
*G06F 3/045*     (2006.01)

(52) U.S. Cl.
USPC .......................................... 345/174; 345/175

(58) Field of Classification Search
USPC .................... 345/173–178; 178/18.01–18.09, 178/20.01–20.04; 715/701–702, 771–773
See application file for complete search history.

(56) References Cited

U.S. PATENT DOCUMENTS

| | | | | |
|---|---|---|---|---|
| 7,800,596 | B2* | 9/2010 | Lowles et al. | 345/177 |
| 7,907,129 | B2* | 3/2011 | Idzik et al. | 345/177 |
| 2007/0236475 | A1* | 10/2007 | Wherry | 345/173 |
| 2010/0161538 | A1* | 6/2010 | Kennedy et al. | 706/47 |
| 2011/0007881 | A1* | 1/2011 | Fujimura et al. | 379/88.23 |
| 2012/0208639 | A1* | 8/2012 | Reynolds et al. | 463/36 |

* cited by examiner

*Primary Examiner* — Vijay Shankar

(57) ABSTRACT

A virtual touch screen system that helps interacting with a computer application on the computer display wherein the system is comprised of: a touchpad connected to the computer and detects a finger position on its surface; a virtual touch screen which is a small window that appears on the computer display presenting a graphical user interface that enables interacting with the computer application; and a virtual spot which is a small circle that appears on the virtual touch screen representing the position of the finger on the touchpad wherein moving the finger on the touchpad manipulates the virtual spot to move on the virtual touch screen to interact with the graphical user interface.

18 Claims, 5 Drawing Sheets

VIRTUAL TOUCH SCREEN SYSTEM

CROSS-REFERENCE TO RELATED APPLICATION

This application claims the benefits of U.S. Provisional Patent Applications No. 61/270,735, filed Jul. 13, 2009.

BACKGROUND

Using the traditional touch screen with the computer has some disadvantages. For example, the user is required to point on a menu, icon, or object with his/her finger on the touch screen while interacting with the computer application which leads to partially obscuring the computer display from the user's eye. Suspending the user's hand above its normal resting place on or near the keyboard for a long period of time while operating the touch screen, fatigues the muscles of the user's hand which leads to a decrease in the user's productivity. Moreover, in many cases the user needs to utilize the computer keyboard while interacting with the touch screen which forces the user's hand to continuously go back and forth between the touch screen and the keyboard, effectively wasting the user's time and efforts.

SUMMARY

The present invention introduces a virtual touch screen system that solves the aforementioned problems of the traditional touch screen. For example, while interacting with a computer application while using the present invention, the user's hand does not obscure the computer display. Also, there is no need to suspend the user's hand above the desk or the supporting surface while using the present invention. In addition to this, the user's hand is positioned adjacent to the computer keyboard to save the user's time and effort while using the computer keyboard and the present invention in a successive manner.

In one embodiment, the present invention is comprised of a touchpad that can be located near the computer keyboard, a virtual touch screen which is a small window that appears on the computer display representing the boundaries or the relative dimensions of the touchpad, and a virtual spot that appears on the virtual touch screen representing the position of the user's finger on the touchpad. Moving the user's finger on the touchpad simultaneously manipulates the virtual spot to move on the virtual touch screen on the computer display.

In one embodiment, the virtual touch screen presents a variety of graphical user interfaces (GUIs) that are comprised of menus, icons, keyboards, or the like, that help in interacting with computer applications. Accordingly, the user can move his/her finger on the touchpad to manipulate the virtual spot to move on the virtual touch screen to interact with the menus, icons, and keyboard of the (GUI). Accordingly, the user can interact with the computer application on the computer display in an innovative manner.

The virtual touch screen presents a variety of GUIs that help the user to achieve his/her tasks faster and simpler. Each computer application has its unique GUI that automatically appears on the virtual touch screen when the computer application is opened or becomes an active or selected application on the computer display. In cases where there is more than one GUI for the same computer application, the user can select the GUI fascia s/he needs to present on the virtual touch screen using a menu that includes the titles or names of the various available GUIs of the computer application.

In one embodiment, the computer application is a two-dimensional computer application such as a Microsoft Office application, an Internet application, or the like. In another embodiment, the computer application is a three-dimensional computer application such as a 3D gaming application, a virtual reality application, or the like. The GUI of the virtual touch screen can be customized by the user according to his/her needs or preference as will be described subsequently.

DETAILED DESCRIPTION

Figure 1:
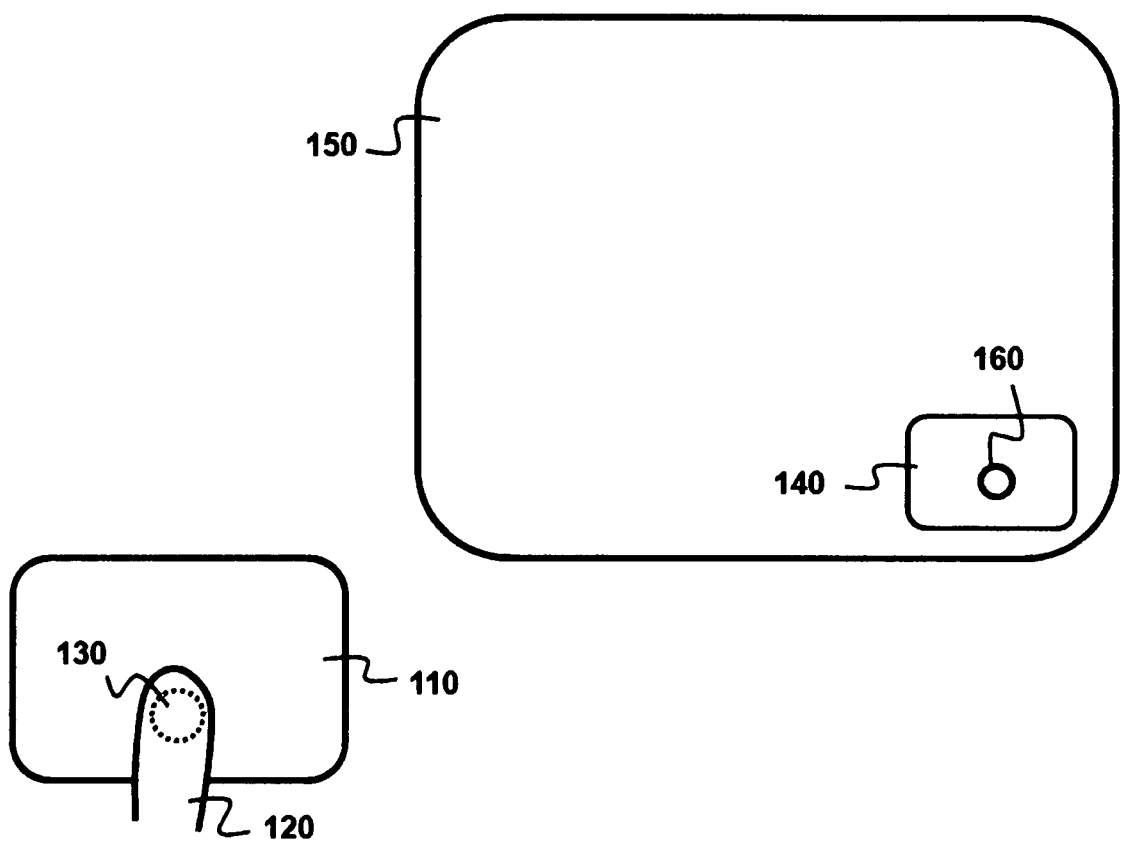
FIG. 1 illustrates the present invention comprised of a touchpad, a virtual touch screen, and a virtual spot according to one embodiment.

Disclosed is the present invention of a virtual touch screen system that enables the user to interact easier and faster with various computer applications. In one embodiment, as illustrated in FIG. 1, the present invention is comprised of: a touchpad 110 that is connected to the computer and can be touched by the finger 120 to provide the computer system with an immediate input representing the point of contact 130 between the finger and the touchpad surface; a virtual touch screen 140 which is a small window that appears on the computer display 150 presenting the boundary of the touchpad; and a virtual spot 160 which is a small circle that appears on the virtual touch screen representing the position of said point of contact on the touchpad.

Figure 2:
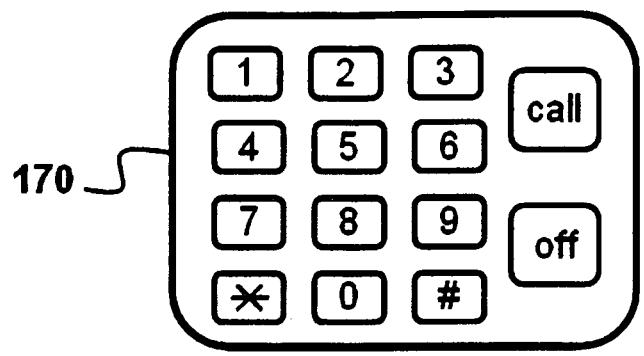
FIG. 2 illustrates an example of a graphical user interface (GUI) in the form of a phone keyboard that appears on the virtual touch screen according to one embodiment.

In one embodiment, the virtual touch screen presents a variety of GUIs on its small window where said GUIs include icons, menus, keyboards, or the like. In one sample case, FIG. 2 illustrates a GUI in the form of a phone keyboard 170, where the finger can be moved on the touchpad to manipulate the virtual spot to move on the virtual touch screen to overlap with a key on the phone keyboard. Once the virtual spot is overlapped with a key on the phone keyboard then tapping on the touchpad provides an immediate input to the computer system representing clicking on this key.

Figure 3:
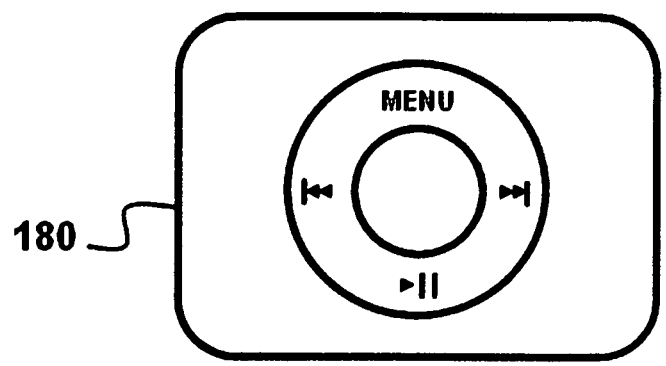
FIG. 3 illustrates an example of a GUI in the form of an iPod wheel that appears on the virtual touch screen according to one embodiment.

In another embodiment as illustrated in FIG. 3, the GUI is in the form of an iPod wheel 180 that helps the user interact with multimedia applications where moving the finger on the touchpad manipulates the virtual spot to move on the iPod wheel on the virtual touch screen. In this case, moving the virtual spot in a specific direction on the iPod wheel or clicking on certain icons or spots on the iPod wheel—by tapping on the touchpad—enables the user to easily control the multimedia application on the computer display.

Figure 4:
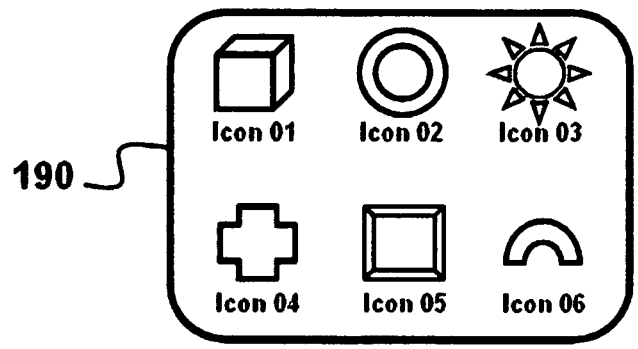
FIG. 4 is an example of a GUI in the form of a plurality of icons that appear on the virtual touch screen according to one embodiment.

In yet another embodiment, as illustrated in FIG. 4, the GUI is in the form of a plurality of icons 190 that help the user to interact faster and easier with a computer application. In this case, moving the finger on the touchpad manipulates the virtual spot to move on the virtual touch screen to overlap with one of the icons of said plurality of icons. At this moment, tapping on the touchpad provides an immediate input to the computer system representing physical clicking on the icon that overlaps with the virtual spot.

Figure 5:
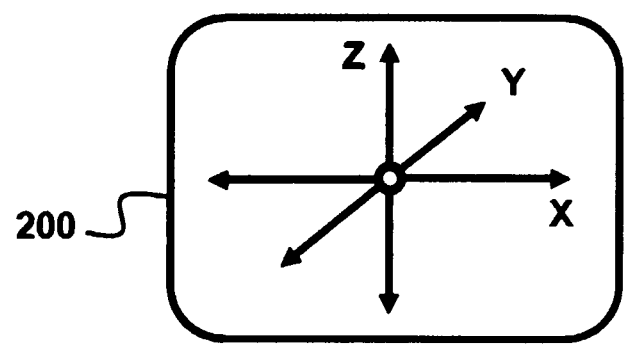
FIG. 5 illustrates an example of a GUI in the form of the x, y, and z-axis that appear on the virtual touch screen according to one embodiment.

In one embodiment, as illustrated in FIG. 5, the GUI is in the form of the x, y, and z-axis 200 that help the user to interact with 3D computer applications. In this case, moving the virtual spot parallel to the x, y, or z-axis on the virtual touch screen manipulates objects to respectively move along the x, y, and z-axis on the computer display. Also, moving the virtual spot perpendicular to the x, y, or z-axis on the virtual touch screen manipulates objects to respectively rotate about the x, y, or z-axis on the computer display.

Each GUI can be assigned to a computer application where opening this computer application on the computer display invokes the virtual touch screen to automatically appear on a corner of the computer display representing the GUI of said computer application. In cases where more than one computer application is opened on the computer display, the virtual touch screen presents the GUI of the selected or current active application on the computer display. This can be achieved by assigning each GUI with the name of its computer application.

Figure 6:
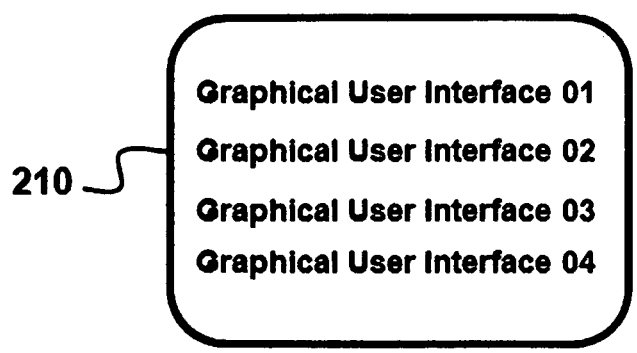
FIG. 6 illustrates a menu that appears on the computer display presenting the names of the GUIs of a computer application according to one embodiment.

In cases where there are a plurality of GUIs for the same computer application, a menu appears on the virtual touch screen presenting the names of said GUIs of said computer application when it is opened or becomes active; the user can then select the name of the GUI to be present in the virtual touch screen. Selecting the GUI can be done by moving the finger on the touchpad then tapping on the touchpad when the virtual spot overlaps the name of the selected GUI. In one sample case, FIG. 6 illustrates an example of a menu 210 that presents a plurality of names of GUIs of a computer application where the user can select one of them as described previously.

The user can control showing or hiding the virtual touch screen on the computer display. This can be achieved by providing the user with a small icon that appears on the bottom bar of the computer display where clicking on this small icon presents a menu indicating two options to "show" or "hide" the virtual touch screen. Selecting the "show" option leads to automatically opening the virtual touch screen on the computer display when the computer application is opened or becomes a current active application on the computer display. Selecting the "hide" option leads to automatically preventing the virtual touch screen to appear on the computer display when the computer application is opened or becomes a current active application on the computer display.

Figure 7:
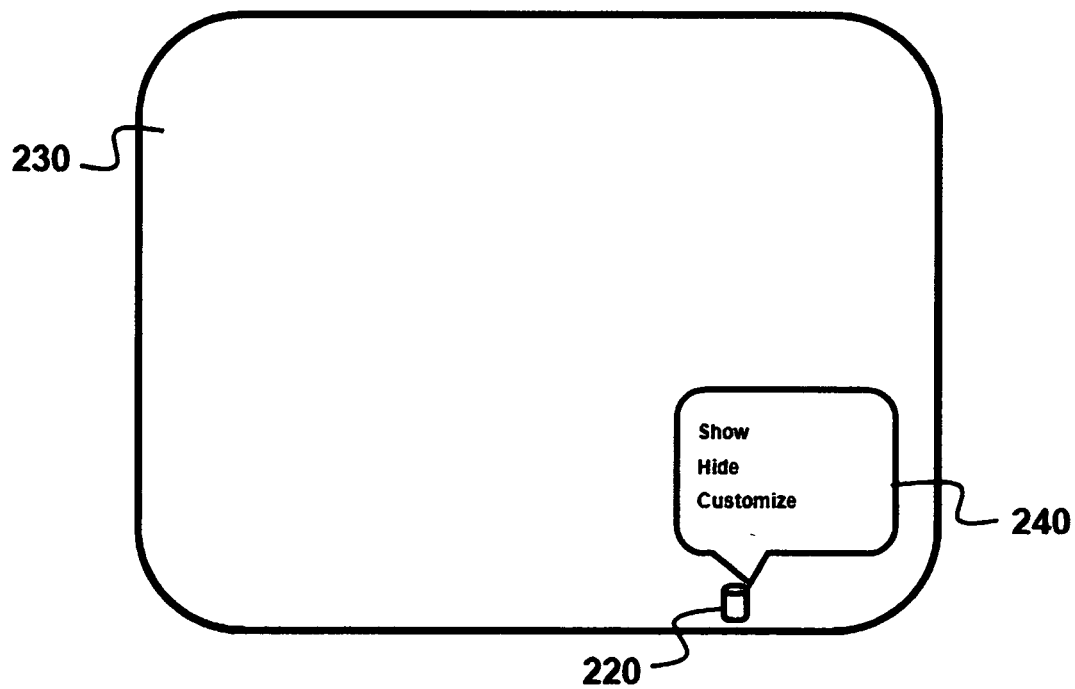
FIG. 7 illustrates small icons that appear on the computer display to enable the user to "show", "hide", or "customize" the virtual touch screen according to one embodiment.

In one sample case, FIG. 7 illustrates an example for a small icon 220 that appears on the bottom bar of the computer display 230, where clicking on the small icon invokes a menu to appear on the computer display 240 presenting three options: "show"; "hide"; and customize". The "show" option is to show the virtual touch screen on the computer display, while the "hide" option is to hide the virtual touch screen on the computer display. The "customize" option is to enable the user to customize the GUI or the virtual touch screen according to his/her needs or preference.

In one embodiment, customizing the GUI means changing the positions, sizes, shapes, colors, or the like of the icons, menus, keyboards, or virtual objects of the GUI. In another embodiment, customizing the GUI means creating a new GUI that includes new icons, menus, keyboards, or other virtual objects. In this case, the user can map each new icon, menu, keyboard button, or object to a keyboard shortcut, keystrokes, or a mouse movement that can be automatically provided to the computer system when this new icon, menu, keyboard button, or object is clicked or selected on the virtual touch screen on the computer display as previously described.

In one embodiment, customizing the virtual touch screen means changing its position shape, size, or the like on the computer display. Changing the size of the virtual touch screen includes changing the dimensions of the small window of the virtual touch screen to completely cover the computer display. In this case the small window will be a transparent window to allow the computer application to appear on the computer display.

In one embodiment, the virtual spot can be customized by the user to change its size, shape, color, or the like according to the user's needs or preferences. In cases where pressure-sensitive touchpads are used, the size of the virtual spot can be associated with the pressure of the finger on the touchpad surface. In other words, decreasing levels of pressure makes the size of the virtual spot smaller, while increasing levels of pressure makes the size of the virtual spot bigger.

Figure 8:
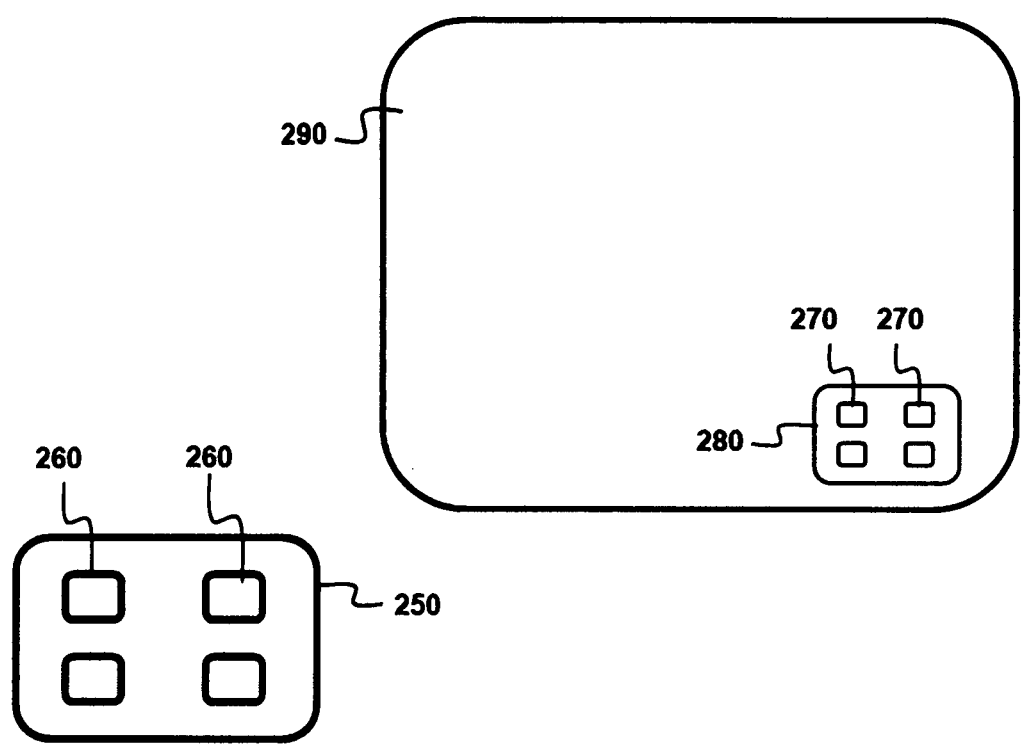
FIG. 8 illustrates a sticker that can be attached to the touchpad to mimic the sensory feeling of touching the objects of the GUI on the virtual touch screen according to one embodiment.

In one embodiment, a sticker can be attached to the touchpad surface to mimic the sensory feeling of touching the objects of the GUI such as icons or keyboard buttons. The sticker includes the image of these icons or keyboard buttons slightly raised from the level of the other sticker parts. In one sample case, FIG. 8 illustrates a sticker 250 attached to the touchpad surface where an image of four slightly raised icons 260 printed on the sticker to represent four icons 270 of a virtual touch screen 280 that appears on the computer display 290.

In one embodiment, the disclosed virtual touch screen system can be used with the laptop to utilize its touchpad. In this case, tapping on a corner of the laptop touchpad for the first time provides the computer system with an input that represents converting the laptop touchpad to work according to the present invention. Tapping again on the laptop touchpad corner provides the computer system with an input that represents converting the laptop touchpad to work according to its original function of manipulating the cursor to move on the computer display.

Overall, the present invention is utilized with a variety of two-dimensional computer applications such as Microsoft Office applications and Internet applications, in addition to, various 3D computer applications such as CAD applications, virtual reality applications, and 3D gaming applications. Moreover, the present invention is utilized with various handheld devices such as mobile phones.

The invention claimed is:

1. A virtual touch screen system comprised of;
   a display presenting at least one application preconfigured to be responsive to a selection of virtual objects presented on a virtual window;
   a virtual window located at one corner of the display to appear with the application wherein the virtual window presents virtual objects and a virtual spot wherein the virtual spot can be moved on the virtual screen to select one of the virtual objects;
   a touch panel that has the same shape and relative dimensions of the virtual window wherein each point on the touch panel corresponding to one point of the virtual window and touching the touch panel by an object provides an input signal representing the point of touch between the object and the touch panel; and a computer system that receives the input signal from the touch panel to manipulate the virtual spot to be moved to a corresponding point on the virtual window to select one of the virtual objects.

2. The system of claim 1 wherein each of the virtual window and the touch panel are divided into equal number of spots or zones wherein each spot of the virtual window corresponding to one spot or zone of the touch panel.

3. The system of claim 1 wherein the application is associated with at least two virtual screens and each one of the at least two virtual screens includes different virtual objects wherein a user can select one of the at least two virtual screens to appear with the application.

4. The system of claim 1 wherein the virtual objects are in the form of three-dimensional objects and the surface of the touch panel is in the form of a three-dimensional surface that matches the form of the three-dimensional objects.

5. The system of claim 1 wherein the virtual spot replicates the shape of the objects that touches the touch panel.

6. The system of claim 1 wherein the positions, sizes, or colors of the virtual objects can be changed on the virtual screen by a user.

7. The system of claim 1 wherein the shape of the virtual screen changes with the change of the shape of the touch panel.

8. The system of claim 1 wherein the shape of the surface of the touch panel changes with the change of the shape of the virtual screen.

9. The system of claim 1, wherein the virtual window represents a keyboard and each one of the virtual objects represents a button of the keyboard.

10. The system of claim 1, wherein the virtual window replicates the shape of the chassis of a computer input device and the virtual objects replicate the shape of the parts of the computer input device.

11. The system of claim 1 wherein the virtual objects representing the x-axis, the y-axis, and the z-axis of the Cartesian coordinate system wherein moving the virtual spot along or about one of the x-axis, the y-axis, and the z-axis provides the computer system with an immediate input representing a movement or rotation in three dimensions.

12. The system of claim 1 wherein the touch panel detects the simultaneous touches of multiple objects at multiple touching points and the virtual spot is multiple virtual spots corresponding to the multiple objects.

13. The system of claim 1 wherein the display is a computer display.

14. The system of claim 1 wherein the display is a head mounted computer display in the form of eyeglasses.

15. The system of 1, wherein the display is a surface and the source of the application and the virtual screen is an image projected form a projector on the surface.

16. The system of claim 1 wherein the virtual window partially covers the application on the display.

17. The system of claim 1 wherein the virtual window is a transparent window that completely covers the application on the display.

18. A computer input method that divides a display into a first region presenting an application and a second region presenting a virtual window that replicates the shape and the relative dimensions of a touch panel wherein the method comprising;

preconfiguring the application to be responsive to signals generated from virtual objects located in certain spot on the virtual window when one of the virtual objects is selected;

dividing the virtual window and the touch panel into equal number of spots corresponding to each other wherein touching a spot on the touch panel makes a virtual spot appears on the corresponding spot on the virtual window; and touching the touch panel in a spot corresponding to a spot of a virtual object on the virtual screen to select the virtual object to generate a signal.

\* \* \* \* \*